(12) United States Patent
Barnes et al.

(10) Patent No.: US 8,047,727 B1
(45) Date of Patent: Nov. 1, 2011

(54) STRAIN-RELIEF ASSEMBLIES AND METHODS FOR A FIELD-INSTALLABLE FIBER OPTIC CONNECTOR

(75) Inventors: Ray S. Barnes, Hickory, NC (US); Kristine A. McEvoy, Fort Worth, TX (US); David W. Meek, Ft. Worth, TX (US); Scott E. Semmler, Keller, TX (US)

(73) Assignee: Corning Cable Systems LLC, Hickory, NC (US)

( * ) Notice: Subject to any disclaimer, the term of this patent is extended or adjusted under 35 U.S.C. 154(b) by 0 days.

(21) Appl. No.: 13/106,224

(22) Filed: May 12, 2011

Related U.S. Application Data

(62) Division of application No. 12/850,999, filed on Aug. 5, 2010, now Pat. No. 7,942,587.

(60) Provisional application No. 60/995,568, filed on Sep. 27, 2007.

(51) Int. Cl.
*G02B 6/38* (2006.01)

(52) U.S. Cl. .......... 385/72; 385/53; 385/56; 385/60; 385/62; 385/66; 385/77; 385/78; 385/81; 385/84

(58) Field of Classification Search .......... 385/53–99
See application file for complete search history.

(56) References Cited

U.S. PATENT DOCUMENTS

| | | | |
|---|---|---|---|
| 3,644,874 A | 2/1972 | Hutter | 339/89 |
| 3,781,762 A | 12/1973 | Quackenbush | 339/89 |
| 4,135,776 A | 1/1979 | Ailawadhi et al. | 339/177 |
| 4,414,697 A | 11/1983 | Hartley | 7/107 |
| 4,593,972 A | 6/1986 | Gibson | 350/96.21 |
| 4,684,201 A | 8/1987 | Hutter | 439/585 |
| 5,040,867 A | 8/1991 | De Jong et al. | 385/60 |

(Continued)

FOREIGN PATENT DOCUMENTS

WO WO98/19192 5/1998

OTHER PUBLICATIONS

Patent Cooperation Treaty, International Search Report for International Application No. PCT/US2008/010864, Mar. 6, 2009, 2 pages.

*Primary Examiner* — Brian M. Healy
*Assistant Examiner* — Guy Anderson

(57) ABSTRACT

A strain-relief assembly for a field-installable fiber optic connector is disclosed, wherein the assembly includes a ferrule holder, an intermediate sleeve, and a crimp sleeve. The ferrule holder back section holds a buffered section of a fiber optic cable, while the ferrule holder front end holds a ferrule and a splice assembly. A stub fiber is held within the ferrule and the splice assembly so as to interface with a section of field optical fiber protruding from the buffered section. The intermediate sleeve engages and generally surrounds a portion of the ferrule holder back section and thus surrounds a portion of the buffered layer. An intermediate sleeve handler may be used to handle the intermediate sleeve and attached the intermediate sleeve to the ferrule holder back section. Stress-relief strands from the fiber optic cable are flared around the outer surface of the intermediate sleeve. A crimp sleeve is placed over the intermediate sleeve to hold the ends of the stress-relief strands in place. The crimp sleeve is then crimped, which fixes the strand ends in place and also fixes the intermediate sleeve in place on the ferrule back section.

5 Claims, 7 Drawing Sheets

U.S. PATENT DOCUMENTS

| | | | | |
|---|---|---|---|---|
| 5,040,876 A | | 8/1991 | Patel et al. | 350/333 |
| 5,141,451 A | | 8/1992 | Down | 439/585 |
| 5,179,608 A | * | 1/1993 | Ziebol et al. | 385/81 |
| 5,202,942 A | | 4/1993 | Collins et al. | 385/87 |
| 5,222,169 A | | 6/1993 | Chang et al. | 385/87 |
| 5,274,903 A | | 1/1994 | Grois et al. | 29/566 |
| 5,338,225 A | | 8/1994 | Jacobsen et al. | 439/585 |
| 5,390,269 A | * | 2/1995 | Palecek et al. | 385/78 |
| 5,418,874 A | | 5/1995 | Carlisle et al. | 385/76 |
| 5,434,941 A | * | 7/1995 | Bechtel et al. | 385/94 |
| 5,436,994 A | | 7/1995 | Ott et al. | 385/86 |
| 5,499,934 A | | 3/1996 | Jacobsen et al. | 439/585 |
| 5,734,770 A | * | 3/1998 | Carpenter et al. | 385/72 |
| 5,748,819 A | * | 5/1998 | Szentesi et al. | 385/60 |
| 5,862,289 A | | 1/1999 | Walter et al. | 385/134 |
| 5,923,804 A | | 7/1999 | Rosson | 385/81 |
| 5,943,460 A | | 8/1999 | Mead et al. | 385/81 |
| 5,984,531 A | | 11/1999 | Lu | 385/60 |
| 6,173,097 B1 | | 1/2001 | Throckmorton et al. | 385/59 |
| 6,179,482 B1 | | 1/2001 | Takizawa et al. | 385/81 |
| 6,234,685 B1 | | 5/2001 | Carlisle et al. | 385/83 |
| 6,318,903 B1 | | 11/2001 | Andrews et al. | 385/77 |
| 6,382,844 B1 | * | 5/2002 | Dubois et al. | 385/81 |
| 6,416,236 B1 | | 7/2002 | Childers et al. | 385/84 |
| 6,439,780 B1 | | 8/2002 | Mudd et al. | 385/83 |
| 6,442,318 B1 | | 8/2002 | Goldman | 385/114 |
| 6,517,255 B2 | | 2/2003 | Mulligan et al. | 385/78 |
| 6,523,241 B1 | | 2/2003 | Hubert et al. | 29/451 |
| 6,533,468 B2 | | 3/2003 | Nakajima et al. | 385/78 |
| 6,536,956 B2 | | 3/2003 | Luther et al. | 385/86 |
| 6,540,410 B2 | | 4/2003 | Childers et al. | 385/78 |
| 6,550,979 B1 | | 4/2003 | Fleenor et al. | 385/78 |
| 6,565,262 B2 | | 5/2003 | Childers et al. | 385/76 |
| 6,585,421 B1 | | 7/2003 | Barnes et al. | 385/53 |
| 6,599,026 B1 | | 7/2003 | Fahrnbauer et al. | 385/77 |
| 6,600,858 B2 | * | 7/2003 | Lutzen et al. | 385/100 |
| 6,609,837 B2 | | 8/2003 | Lampert | 385/72 |
| 6,652,156 B2 | | 11/2003 | Shinagawa et al. | 385/78 |
| 6,655,851 B1 | | 12/2003 | Lee | 385/78 |
| 6,695,489 B2 | * | 2/2004 | Nault | 385/78 |
| 6,726,369 B1 | * | 4/2004 | Bates et al. | 385/53 |
| 6,764,221 B1 | | 7/2004 | De Jong et al. | 385/55 |
| 6,848,838 B2 | * | 2/2005 | Doss et al. | 385/81 |
| 6,870,996 B2 | * | 3/2005 | Doss et al. | 385/134 |
| 6,883,974 B2 | * | 4/2005 | Bates et al. | 385/76 |
| 6,973,252 B2 | * | 12/2005 | Doss et al. | 385/137 |
| 7,003,869 B2 | | 2/2006 | Lutzen et al. | 29/751 |
| 7,086,785 B1 | * | 8/2006 | Bates, III | 385/78 |
| 7,134,189 B2 | | 11/2006 | Buenz et al. | 29/748 |
| 7,204,016 B2 | | 4/2007 | Roth et al. | 29/749 |
| 7,209,629 B2 | * | 4/2007 | Bianchi et al. | 385/147 |
| 7,270,487 B2 | | 9/2007 | Billman et al. | 385/77 |
| 7,431,513 B2 | * | 10/2008 | Sezerman et al. | 385/53 |
| 7,543,993 B2 | * | 6/2009 | Blauvelt et al. | 385/88 |
| 7,561,917 B2 | * | 7/2009 | Wegrzyn et al. | 607/36 |
| 7,568,845 B2 | * | 8/2009 | Caveney et al. | 385/87 |
| 7,785,017 B2 | * | 8/2010 | Barnes et al. | 385/72 |
| 2001/0002220 A1 | | 5/2001 | Throckmorton et al. | 385/66 |
| 2003/0063868 A1 | | 4/2003 | Fentress | 385/78 |
| 2003/0215171 A1 | | 11/2003 | Lampert et al. | 385/11 |
| 2005/0244108 A1 | | 11/2005 | Billman et al. | 385/60 |

* cited by examiner

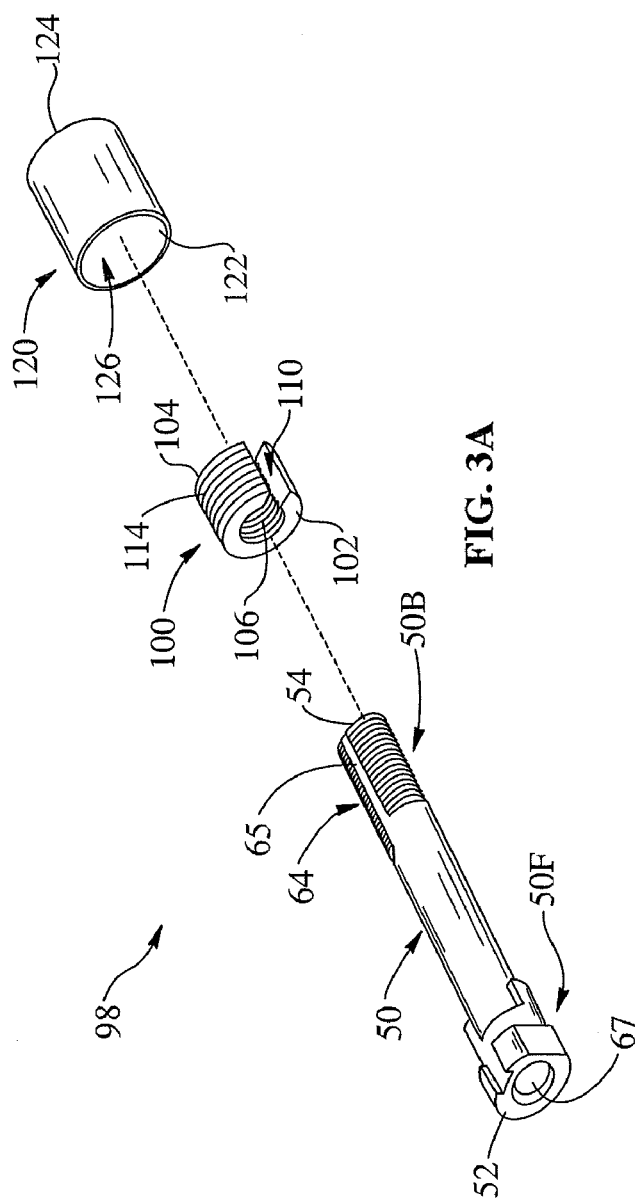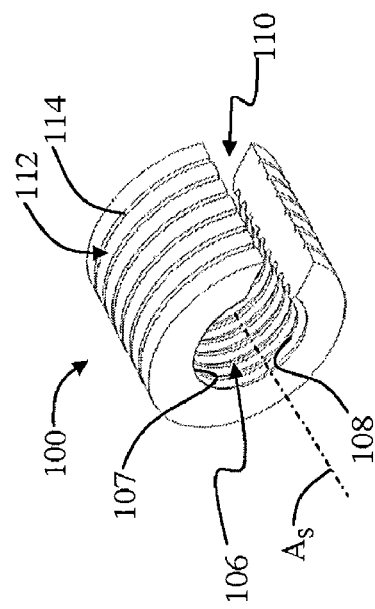

STRAIN-RELIEF ASSEMBLIES AND METHODS FOR A FIELD-INSTALLABLE FIBER OPTIC CONNECTOR

CROSS REFERENCE TO RELATED APPLICATION

This application is a Divisional of U.S. Ser. No. 12/850,999 filed Aug. 5, 2010, now U.S. Pat. No. 7,942,587 which claims the priority of U.S. application Ser. No. 11/983,066 filed Nov. 7, 2007 and U.S. Provisional Application Ser. No. 60/995,568, filed Sep. 27, 2007, the entire contents of which is hereby incorporated by reference in their entirety.

BACKGROUND OF THE INVENTION

1. Field of the Invention

The present invention relates generally to fiber optic cables, and in particular, to an assembly for providing strain-relief for field-installable connectors for fiber optic cables.

2. Technical Background

Optical fibers are widely used in a variety of applications, including the telecommunications industry in which optical fibers are employed in a number of telephony and data transmission applications. Due, at least in part, to the extremely wide bandwidth and the low noise operation provided by optical fibers, the use of optical fibers and the variety of applications in which optical fibers are used are continuing to increase. For example, optical fibers no longer serve as merely a medium for long distance signal transmission, but are being increasingly routed directly to the home or, in some instances, directly to a desk or other work location.

The ever increasing and varied use of optical fibers has spurred the use of field installable optical fiber connectors. Field installable optical fiber connectors are used to terminate the ends of optical fibers, and enable quicker connection and disconnection than fusion splicing. A typical connector holds the end of each optical fiber in a ferrule. The connector aligns the core of the two fibers so that light can pass between the fiber ends, and provides a mechanical coupling to hold the two fiber ends together. Connectors have traditionally been one of the main concerns in using fiber optic systems because they introduce loss and because different connector types were typically not compatible. While the use of connectors was once problematic, manufacturers have standardized and simplified them greatly. This increasing user-friendliness has contributed to the increase in the use of fiber optic systems.

Current field installable connectors are designed to be installed and strain relieved on fiber cables or fiber smaller than 2.9 mm. Common cable/fiber sizes are 900 µm tight-buffered fiber and 2.9 mm jacketed cable. A typical 2.9 mm jacketed cable consists of 900 µm tight-buffered fiber surrounded by aramid yarn and a thin walled jacket. A need exists for fiber optic cables having larger fiber optic cables. Unfortunately, installing field-installable connectors directly onto larger fiber optic cables is problematic given conventional connector designs. Therefore, a need exists for new fiber optic connectors adapted for larger fiber optic cables, as well as standard fiber optic cables that may comprise additional and/or alternative structures.

SUMMARY OF THE INVENTION

An aspect of the invention is a strain-relief assembly for a field-installable fiber optic connector configured to support a fiber optic cable having a buffered portion and strain-relief strands. The assembly includes a ferrule holder having a back section with an open back end and configured to accommodate the buffered optical fiber portion. The assembly also includes an intermediate sleeve configured to surround and engage a portion of the ferrule holder back section. The assembly also has a crimp sleeve having an inner surface and that covers the intermediate sleeve. The strain-relief strands are arranged between the crimp sleeve inner surface and the intermediate sleeve outer surface. The crimp sleeve is crimped to capture the strain-relief strands between the crimp sleeve and the intermediate sleeve.

Another aspect of the invention is a method of providing strain-relief in a connector for a fiber optic cable that has an optical fiber section, a buffer section, strain-relief strands, and a protective jacket. The method includes inserting the optical fiber section and the buffered section into a back section of a ferrule holder. The method also includes providing an intermediate sleeve having inner and outer surfaces, and engaging the intermediate sleeve with the ferrule holder back section to surround the ferrule holder back section. The method also includes placing a plurality of the strain-relief strands over the intermediate sleeve outer surface. The method further includes placing a crimp sleeve around the intermediate sleeve and the strain-relief strands and then crimping the crimp sleeve so as to secure the strain-relief strands and to fix the intermediate sleeve onto the ferrule holder back section. The method optionally includes using an intermediate sleeve handler that facilitates installing the intermediate sleeve onto the ferrule holder back section.

Another aspect of the invention is a strain-relieved connector for a fiber optic cable that has an optical fiber with a front end, a buffered layer, and strain-relief strands. The connector includes a ferrule holder having a front section with an open front end and a back section having an open back end, wherein the open front and back ends are connected by a ferrule holder channel. A ferrule and a splice assembly are arranged in the ferrule holder front end, the ferrule and splice assembly having respective central channels. A fiber stub is held within the ferrule and splice assembly channels, wherein the fiber stub has a back end residing in the splice assembly channel. The buffered layer is held in the ferrule holder back section so that the fiber stub back end interfaces with the optical fiber front end within the splice assembly channel. The connector also includes an intermediate sleeve that engages and surrounds a portion of the ferrule holder back end section so as to surround the buffered layer held therein. The connector also has a crimp sleeve that is arranged around the intermediate sleeve so as to hold the ends of the strain-relief strands between the crimp sleeve and the intermediate sleeve. When the crimp sleeve is crimped, it fixes the strain-relief strands between the crimp sleeve and the intermediate sleeve and also fixes the intermediate sleeve to the ferrule holder back end.

Another aspect of the invention is an intermediate sleeve handler for holding and handling the aforementioned intermediate sleeve. The handler includes a C-shaped sleeve having an inner surface, an outer surface, front and back end faces, and a central hole having an central axis and connecting the front and back end faces and sized to press fit the intermediate sleeve. A gap in the outer surface connects to the central hole and defines the C-shape of the handler. The gap at is sized to fit over a buffered section of a fiber optic cable so that it can be placed on an off of the fiber via the exposed buffered section between the lead-in tube and the fiber optic cable. The handler includes a shelf arranged in the central hole that serves as a stop when the intermediate sleeve is press-fit into the central hole.

Additional features and advantages of the invention will be set forth in the detailed description that follows, and in part will be readily apparent to those skilled in the art from that description or recognized by practicing the invention as described herein, including the detailed description that follows, the claims, as well as the appended drawings.

It is to be understood that both the foregoing general description and the following detailed description present embodiments of the invention, and are intended to provide an overview or framework for understanding the nature and character of the invention as it is claimed. The accompanying drawings are included to provide a further understanding of the invention, and are incorporated into and constitute a part of this specification. The drawings illustrate various embodiments of the invention, and together with the description, serve to explain the principles and operations of the invention.

BRIEF DESCRIPTION OF THE DRAWINGS

FIG. 3A is an elevated perspective view of the intermediate sleeve, the crimp sleeve and the ferrule holder of the strain-relief assembly of the present invention;

FIG. 3B is a close-up perspective view of the example embodiment of the intermediate sleeve in which the sleeve is C-shaped and threaded, and which has a grooved outer surface;

DETAILED DESCRIPTION OF THE PREFERRED EMBODIMENTS

Reference is now made in detail to the present preferred embodiments of the invention, examples of which are illustrated in the accompanying drawings. Whenever possible, the same reference numbers and symbols are used throughout the drawings to refer to the same or like parts. Use of the terms "front," "forward," "rear," "rearward," "back," and "backward" are relative terms used for the sake of illustration.

Figure 1:
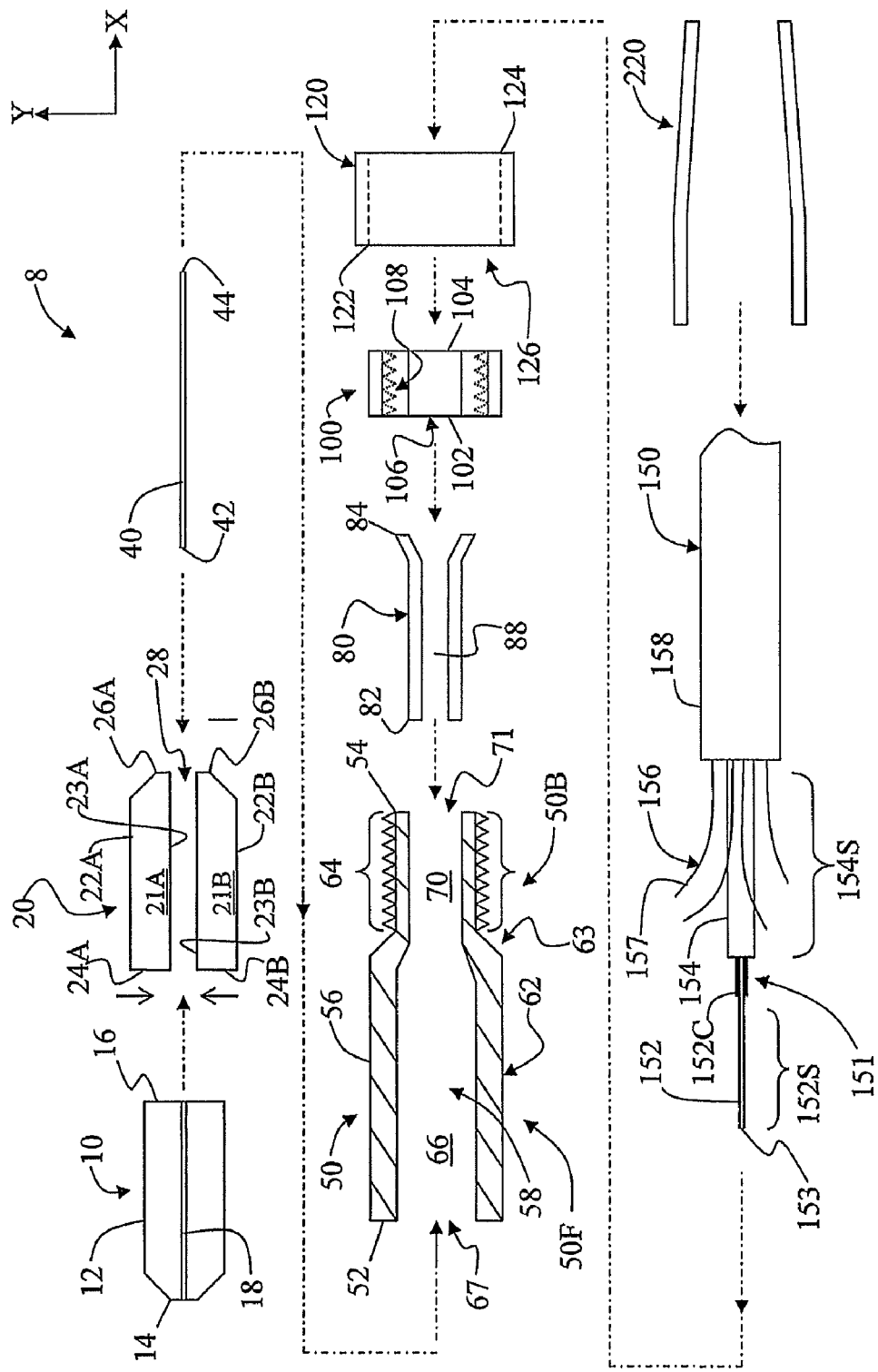
FIG. 1 is an exploded side view of an example embodiment of a fiber optic connector ("connector") according to the present invention that employs the strain-relief assembly of the present invention.

FIG. 1 is an exploded view of an example embodiment of a fiber optic connector ("connector") 8 according to the present invention that employs the strain-relief assembly of the present invention. In an example embodiment, fiber optic connector 8 includes many aspects in common with the fiber optic connector described in U.S. Pat. No. 7,270,487, which patent is incorporated by reference herein.

Figure 2:
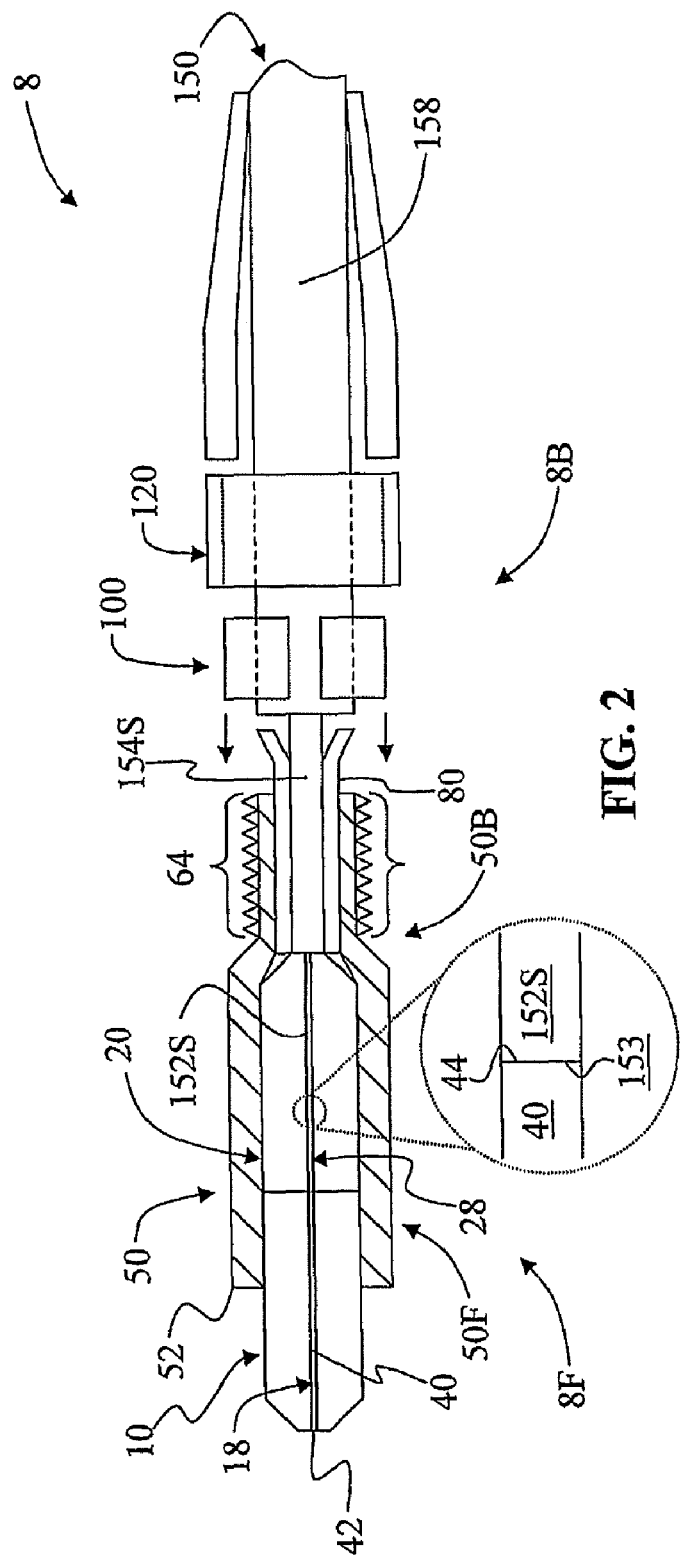
FIG. 2 is a side view of the connector of FIG. 1 in the process of being connected to the oversized fiber optic cable shown in FIG. 1.

Connector 8 has a front section 8F and back section 8B. Cartesian X-Y axes are shown for the sake of reference. FIG. 2 is a side view of the connector of FIG. 1 in the process of being connected to an oversized fiber optic cable 150.

Connector 8 is designed for use with an oversized fiber optic cable 150 that has an optical fiber 151 made up of a field fiber 152 surrounded by one or more protective coatings 152C (e.g. a 250 μm and a 900 μm coating). Field fiber 152 is surrounded by a strain-relief layer 156 having strain-relief strands 157, and a protective outer jacket 158 that surrounds the strain-relief layer. Using known techniques, fiber optic cable 150 as shown in FIG. 1 has been prepared for field-connectorization with connector 8. Fiber optic cable so prepared includes a field optical fiber section 152S with an end 153, a buffer section 154S, and exposed strain-relief strands 157.

In an example embodiment, field optical fiber 152 has a 125 μm diameter. Also in an example embodiment, buffer layer 154 has a diameter in the range from about 250 μm to about 1 mm diameter (e.g., 900 μm), and a strain-relief layer that includes strain-relief strands 157. In an example embodiment, strain-relief strands 157 are aramid yarn and are exposed in about 15 mm lengths when cable 150 is being prepared for connectorizing. Further, in the example embodiment, protective outer jacket 158 has an annular thickness of about 2 mm. In an example embodiment, fiber optic cable 150 has an overall diameter of about 4.8 mm or greater, which by present-day standards is considered "oversized." In another example embodiment, optical fiber 151 is a bend-insensitive fiber, such as a so-called "holey" fiber or a nanostructured fiber. Examples of such optical fibers are described in, for example, U.S. Pat. No. 6,243,522, pending U.S. patent application Ser. No. 11/583,098 filed Oct. 18, 2006, and provisional U.S. patent application Ser. Nos. 60/817,863 filed Jun. 30, 2006; 60/817,721 filed Jun. 30, 2006; 60/841,458 filed Aug. 31, 2006; 60/841,490 filed Aug. 31, 2006; and 60/879,164, filed Jan. 8, 2007 (hereinafter, "the Corning nanostructure fiber patents and patent applications"), all of which are assigned to Corning Incorporated and all of which are incorporated by reference herein.

Connector 8 includes a ferrule 10, which in an example embodiment includes an outer surface 12, front and back ends 14 and 16, and a central channel 18 open at ends 14 and 16. Central channel 18 is sized to accommodate an optical fiber such as field optical fiber 152.

Connector 8 also includes a splice assembly 20, which in an example embodiment accommodates a mechanical splice, that includes an upper member 21A and a lower member 21B. Upper member 21A includes an outer surface 22A, an inner surface 23A, and front and back ends 24A and 26A. Likewise, lower member 21B includes an outer surface 22B, an inner surface 23B, and front and back ends 24B and 26B. Upper and lower members are brought together so that inner surfaces 23A and 23B define a central through channel 28 sized to accommodate a field optical fiber such as field fiber 152. Ferrule 10 and splice assembly 20 are arranged end-to-end, as shown in FIG. 2.

Connector 8 further includes an optical fiber section 40 having respective front and back ends 42 and 44. Optical fiber section 40 resides in channels 18 and 28 of ferrule 10 and splice assembly 20, with fiber end 42 being flush with ferrule front end 14 and fiber end 44 residing in channel 28. Optical fiber section 40 serves as a "stub" fiber for the connector and so is referred to hereinafter as "stub fiber" 40.

Connector 8 further includes a ferrule holder 50 having a front section 50F and a back section 50B. Front section 50F includes an open front end 52, and back section 50B that includes an open back end 54. Ferrule holder 50 includes an outer surface 56 and a central channel (also called a "ferrule bore") 58 open at front end 52 and back end 54. In an example embodiment, outer surface 56 includes a smooth region 62 and an outer threaded region (i.e., outer threads) 64. In an example embodiment, outer threads may include one or more slots 65 (FIG. 3A) to key a cam 212 (not shown in FIG. 1; see FIG. 7).

Ferrule holder 50 is shown in FIG. 1 and in other figures as having a flared outer surface 56 for the sake of illustration. However, outer surface 56 need not be flared, such as shown in FIG. 3A, discussed below.

In an example embodiment, ferrule holder 50 is made of metal such as nickel silver (NiAg), which is stronger than conventional plastic ferrule holders. Ferrule channel 58 includes a front section 66 having an opening 67 at front end 52 and corresponding to surface region 62 and sized to accommodate ferrule sections 10 and splice assembly 20. Channel 58 also includes a narrower back section 70 having an opening 71 at back end 54. Threads 64 are formed on ferrule back section 70, which in an example embodiment is sized to accommodate a lead-in tube, discussed below. Ferrule holder 50 holds ferrule 10 and splice assembly 20 in front section 66, with front end 14 of ferrule 10 extending out from ferrule holder front end 52, as shown in FIG. 2.

Connector 8 also includes a lead-in tube 80 that has a front end 82, a flared back end 84, and a central channel 88 open at the front and back ends. Central channel 88 is sized to accommodate buffer section 154S of fiber optic cable 150. Lead-in tube 80 resides within ferrule holder back channel 70, with flared end 84 extending from ferrule holder back end 54 (FIG. 2). Flared end 84 facilitates the insertion of field optical fiber section 152S into ferrule channels 18 and 28, and buffered fiber section 154S into the lead-in tube. When so inserted, end 153 of field optical fiber section 152S abuts end 44 of stub fiber 40 within channel 28 of splice assembly 20 to define a mechanical splice, as illustrated in the inset of FIG. 2. Also, buffered fiber section 154S resides within lead-in tube 80, also as shown in FIG. 2.

Connector 8 also includes a strain relief assembly 98, a perspective close-up view of which is shown in FIG. 3A. Strain relief assembly 98 includes ferrule holder 50 and an intermediate sleeve 100 having front and back end faces 102 and 104, a central axis $A_S$, and a central hole 106 centered around axis $A_S$ and defined by an inner surface 107. In an example embodiment illustrated in FIG. 3B, intermediate sleeve 100 is C-shaped and includes inner threads 108. The C-shaped intermediate sleeve 100 includes a gap 110 open to central hole 106 that defines the C-shape. Gap 110 is sized to fit over buffered portion 154. This allows intermediate sleeve 100 to be slipped over the exposed buffered portion 154 between the end of lead-in tube 80 and fiber optic cable 150 so it can be added to connector 8 at ferrule back section 50B, as described below.

Hole 106 and inner threads 108 are sized so that intermediate sleeve 100 can threadedly engage the outer threads 64 of ferrule holder back section 50B and be secured thereto. In an example embodiment, intermediate sleeve 100 has an outer surface 112 with one or more grooves 114 running parallel to the front and back end faces 102 and 104, as shown. One or more grooves 114 are configured to facilitate gripping strain-relief strands 157 to provide additional strain relief, as described in greater detail below. In an example embodiment, intermediate sleeve 100 is made of aluminum. Also in an example embodiment, intermediate sleeve 100 is about 3.5 mm long and about 5 mm in diameter.

For the sake of discussion, intermediate sleeve 100 is discussed below in connection with its C-shaped threaded embodiment. Other embodiments can also be used for intermediate sleeve 100, such as for example, a non-threaded version that is otherwise fixable to the ferrule holder end (which also need not be threaded), such as through the use of a snap-connect or via an adhesive or glue. Other embodiments of intermediate sleeve 100 include a clam-shell type design (not shown) that opens up to fit around and engage ferrule back section 50B. Still further embodiments of the present invention comprise alternative intermediate sleeves to facilitate the gripping of the strain-relief strands 157 to provide strain relief.

Strain relief assembly 98 also includes a crimp sleeve 120 having respective front and back ends 122 and 124, and a central opening 126 sized so that the crimp sleeve can slide over the outside of intermediate sleeve 100. Crimp sleeve is preferably made of a relatively soft metal such as copper so that it can be crimped over intermediate sleeve 100. Still further embodiments of the present invention comprise crimp sleeves and/or intermediate sleeves of alternative materials suitable for engaging one another and/or for providing strain relief.

Figure 4:
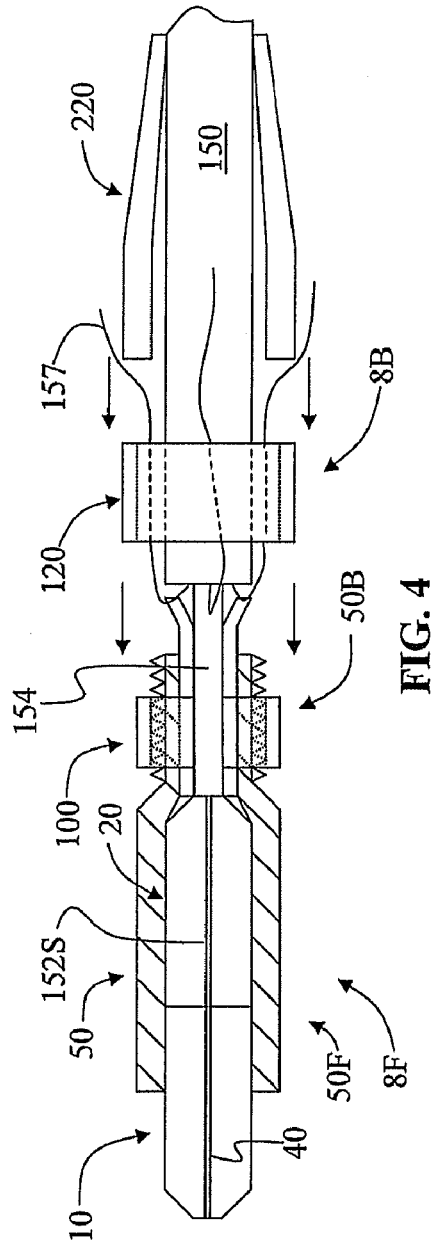
FIG. 4 is a side view similar to FIG. 2, but showing the intermediate sleeve threaded onto the threaded back section of the ferrule holder while the crimp sleeve holds the strain-relief strands out of the way against the fiber optic cable.

Once fiber optic cable is prepared for connectorizing as shown in FIG. 1, but with a fiber coating 152C removed to lengthen field fiber section 152S. Strain relief assembly 98 is then ready to be incorporated into the connector. In FIG. 2, strain-relief strands 157 are not included for ease of illustration. FIG. 4 shows strain-relief strands 157 as being temporarily held back against cable 150 by crimp sleeve 120.

At the point of assembly shown in FIG. 2, lead-in tube 80 can be crimped onto buffered layer 154 to provide initial stress relief while the parts making up strain-relief assembly 98 are added to the connector.

Figure 5:
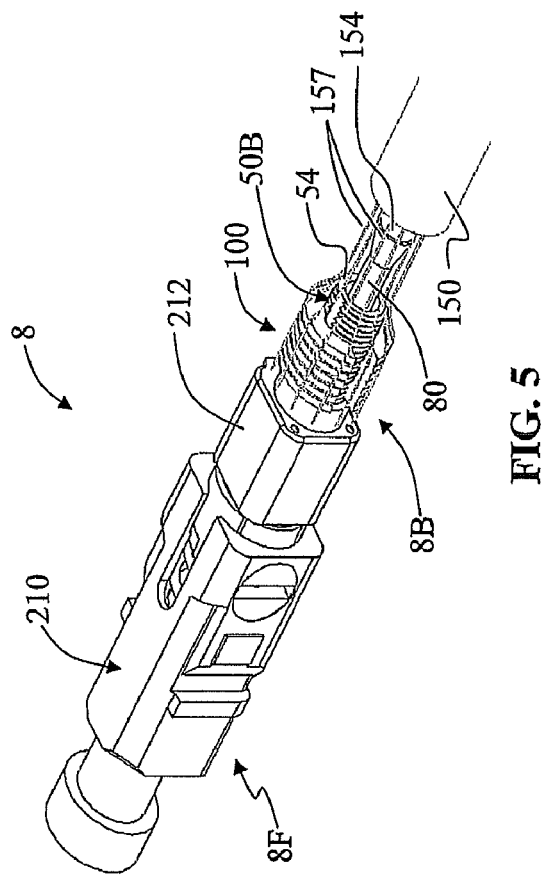
FIG. 5 is an elevated perspective view of the connector showing the strain-relief strands flared around the intermediate sleeve.

With continuing reference to FIG. 2 and as discussed above, intermediate sleeve 100 slips on over the exposed buffer layer 154 between lead-in tube 80 and fiber optic cable 150. Intermediate sleeve 100 is then placed on ferrule holder back section 50B, where inner threads 108 engage outer threads 64. Intermediate sleeve 100 is then threaded onto ferrule holder back section 50B and surrounds a portion thereof, thereby also surrounding a portion of buffer layer 154 held in the ferrule back section. Once intermediate sleeve 100 is in place as shown in FIG. 4, crimp sleeve 120 is moved to release strain-relief strands 157 held thereby. Strain-relief strands 157 are then flared around grooved outer surface 112, as shown in FIG. 5. Note that in FIG. 5, connector 8 includes an inner housing 210 that covers ferrule holder front end 50F and cam 212 covering ferrule holder 50 at back section 50B but adjacent intermediate sleeve 100 and forward thereof.

Figure 6:
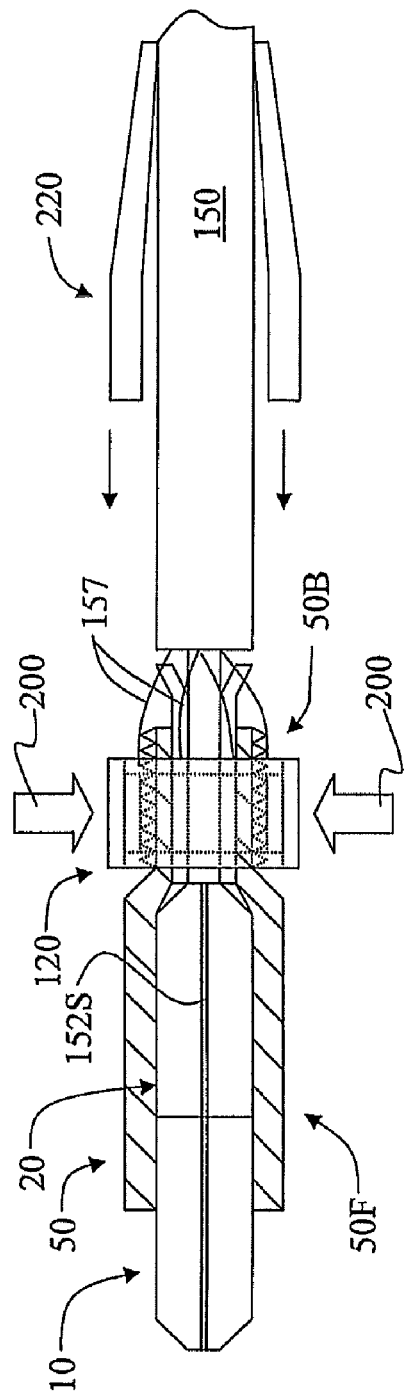
FIG. 6 is a side view similar to FIG. 4, illustrating the connector with the crimp sleeve surrounding the intermediate sleeve and holding strain-relief strands in place on the intermediate sleeve, and also showing the crimping force applied to the crimp sleeve.

With reference now to FIG. 6, crimp sleeve 120 is moved from its holding place on cable 150 to cover intermediate sleeve 100. This traps strain-relief strands 157 between the intermediate sleeve and the crimp sleeve, with grooves 114 on outer surface 112 of the intermediate sleeve serving to hold the strand ends in place.

Also as shown in FIG. 6, in the next step crimp sleeve 120 is crimped (e.g., hexagonally crimped), as illustrated by arrows 200. This squeezes the intermediate sleeve and the crimp sleeve together, which serves to hold strain-relief strands 157 in place and provide stress relief. It also causes gap 110 to at least partially close in certain embodiments of the present invention, which serves to secure the intermediate sleeve to the ferrule holder, thereby providing further strain relief at back end 8B of connector 8.

Figure 7:
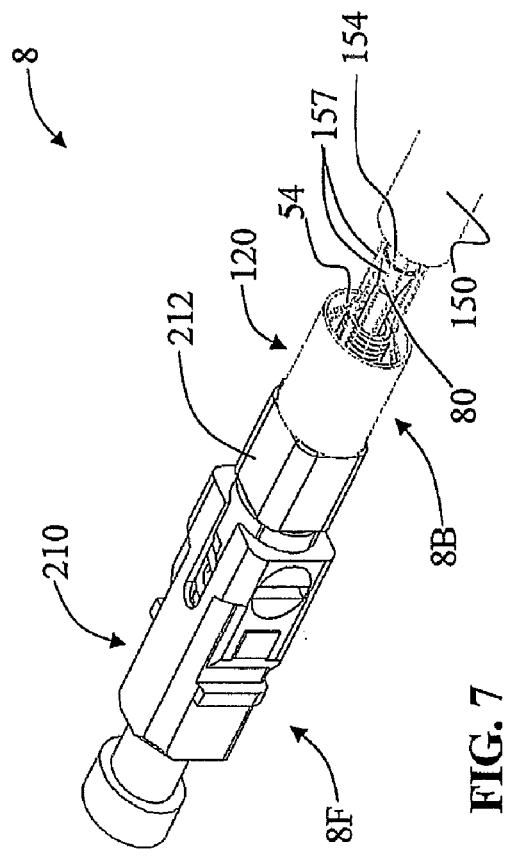
FIG. 7 is an elevated perspective view of the connector similar to FIG. 5, showing the crimp sleeve in place over the intermediate sleeve at the threaded end of the ferrule holder.

FIG. 7 is an elevated perspective view of the connector similar to FIG. 5, showing an inner housing 210 in place at the connector front end 8F and crimp sleeve 120 in place over intermediate sleeve 100 at ferrule holder back section 50B.

Figure 8:
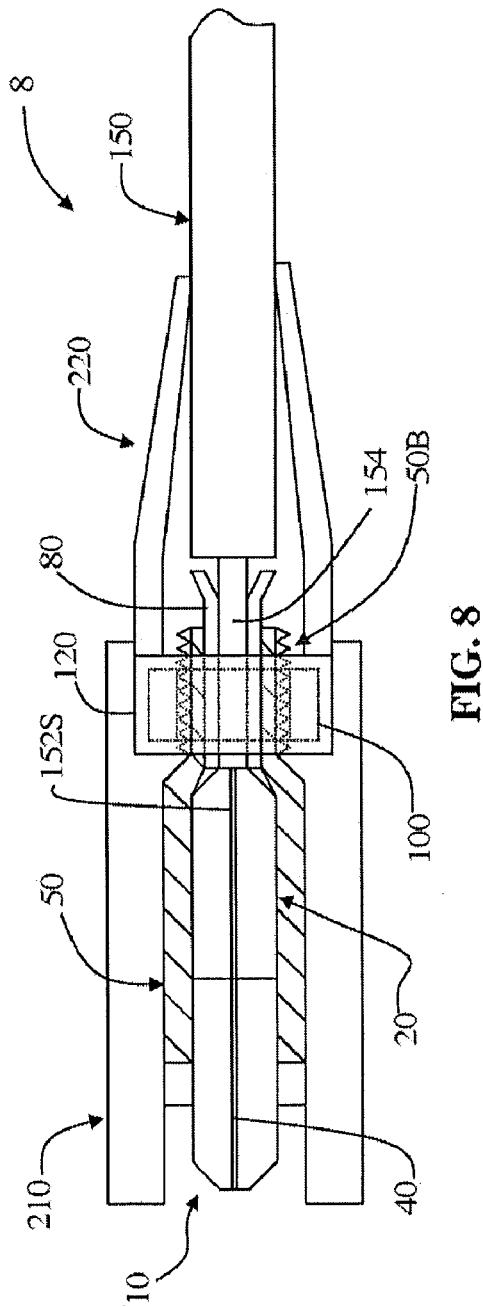
FIG. 8 is a side view similar to FIG. 6, showing the housing and the boot placed over the front and back ends of the connector, respectively.
Figure 9:
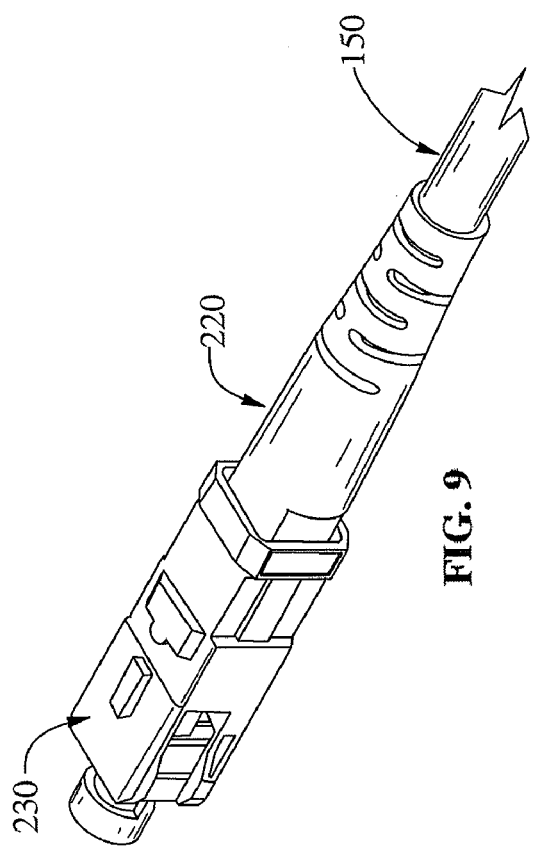
FIG. 9 is an elevated perspective view similar to FIG. 7, showing the connector with the housing and boot in place.

Once intermediate sleeve 100 and crimp sleeve 120 are crimped in place on ferrule holder back section 50B, a protective boot 220, temporarily stored over cable 150, is slid over connector back end 8B, as shown in the side view of FIG. 8 and the elevated perspective view of FIG. 9. FIG. 9 also shows an outer housing or "shroud" 230 arranged over the inner housing 210 (see FIG. 7 and FIG. 8) at connector front end 8F.

Intermediate Sleeve Handler

Figure 10:
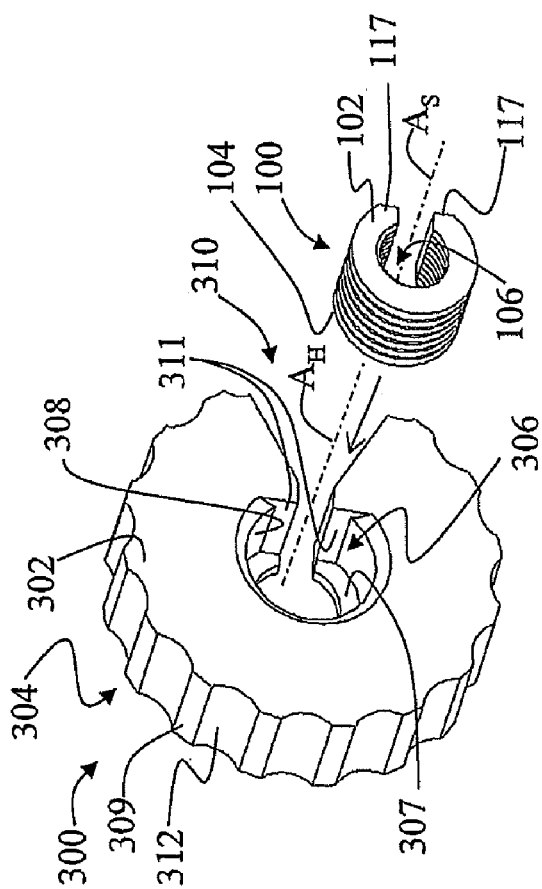
FIG. 10 is perspective view of the intermediate sleeve handler of the present invention, along with the intermediate sleeve prior to being inserted into the central hole of the handler.

Because intermediate sleeve 100 is relatively small (e.g., about 5 mm in diameter), it may prove difficult to handle when installing strain-relief assembly 98 onto connector 8. Accordingly, with reference to FIG. 10, the present invention includes an intermediate-sleeve handler ("handler") 300 used to handle intermediate sleeve 100. Handler 300 has front and back end faces 302 and 304 and a central hole 306 centered on a central axis $A_H$. Handler 300 includes a shelf 307 between the central hole and back end face that serves as a stop against which intermediate sleeve 100 abuts when placed within the handler central hole, as discussed below. Handler 300 has a smooth inner surface 308, an outer surface 309, and a gap 310 in the outer surface and that opens to the central hole to define a C-shape for the handler. Inner surface 308 includes opposing lips 311 on opposite sides of gap 310. In an example embodiment, handler 300 includes one or more grooves 312 that facilitate gripping and handling the handler. Gap 310 is sized so that it fits over the buffered section of a fiber optic cable.

Figure 11:
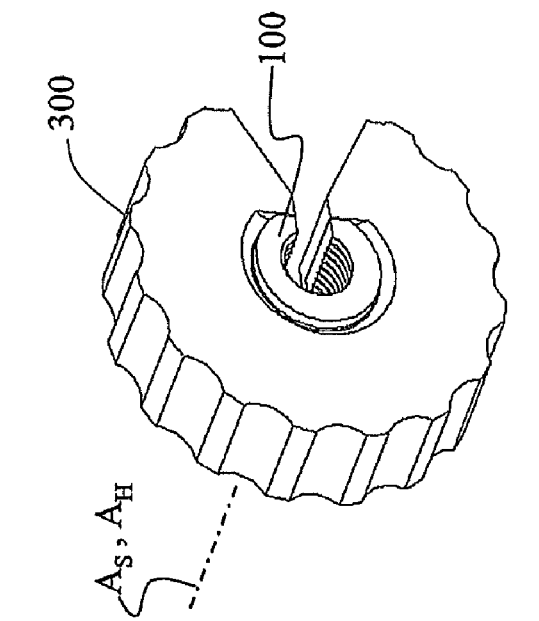
FIG. 11 is a perspective view similar to that of FIG. 10, but with the intermediate sleeve being held within the handler.

Handler hole 306 is sized so that intermediate sleeve 100 can be easily pressed into the central hole at the handler front end face 302 with one of the intermediate sleeve end faces (e.g., back end face 104) coming to a rest against shelf 307, and so that handler axis $A_H$ and intermediate sleeve axis $A_S$ are aligned, as shown in FIG. 11.

It is important that handler gap 310 line up with intermediate sleeve gap 110, as best illustrated in FIG. 11. This can be done using a fixture in the factory, or by keying the intermediate sleeve and the installation handler. One way to key these two components is by providing flat sections 117 on the intermediate sleeve outer surface adjacent gap 110, and by providing corresponding flat sections (lips) 311 on handler inner surface 108 so that these respective flat surfaces engage when the respective gaps line up. This engagement also serves to cause intermediate sleeve 100 to rotate along with handler 300 when the handler is rotated (e.g., when threading the intermediate sleeve onto the ferrule holder back section), rather than having the intermediate sleeve rotate independently within the handler.

To install intermediate sleeve 100 onto the back of connector 8 using handler 300, handler front face 302 faces ferrule back section 50B. Next, the aligned handler and intermediate sleeve gaps 310 and 110 are slid over the exposed buffer section 154 between the flared back end 84 of lead-in tube 80 and oversized cable 150. Intermediate sleeve 100 is then threaded onto ferrule holder back section 50F using handler 300. Handler 300 is then pulled back towards cable 150 and away from connector 8 until is it back at the exposed buffer section 154, where it can be removed via gap 310. Since intermediate sleeve is held in position on ferrule holder back section 50B by the engaged threads and was held within handler 300 only with a slight press fit, the handler and intermediate sleeve easily disengage when the handler is pulled away from the ferrule back section.

The present invention has the advantage that it allows for proper installation and strain relief of a field-installable fiber optic connector directly on a fiber optic cable, such as an oversized fiber optic cable, as opposed to being installed on the tight-buffered fiber portion inside the cable. This results in a more stable fiber optic cable termination.

It will be apparent to those skilled in the art that various modifications and variations can be made to the present invention without departing from the spirit and scope of the invention. Thus, it is intended that the present invention cover the modifications and variations of this invention provided they come within the scope of the appended claims and their equivalents.

What is claimed is:

1. A strain-relieved connector for a fiber optic cable that has an optical fiber with a front end, a buffered layer, and strain-relief strands, the strain-relieved connector comprising:
   a ferrule holder having a front section with an open front end and a back section having an open back end, wherein the open front and back ends are connected by a ferrule holder channel;
   a ferrule and a splice assembly arranged in the ferrule holder front end, the ferrule and splice assembly having respective central channels;
   a fiber stub held within the ferrule and splice assembly channels, wherein the fiber stub has a back end residing in the splice assembly channel;
   the buffered layer held in the ferrule holder back section so that the fiber stub back end interfaces with the optical fiber front end within the splice assembly channel;
   an intermediate sleeve that engages and generally surrounds a portion of the ferrule holder back end section so as to generally surround the buffered layer held therein; and
   a crimp sleeve arranged around the intermediate sleeve so as to hold ends of the strain-relief strands between the crimp sleeve and the intermediate sleeve,
   wherein the crimp sleeve grips the strain-relief strand ends between the crimp sleeve and the intermediate sleeve,
   wherein the crimp sleeve fixes the intermediate sleeve to the ferrule holder back end.

2. The connector of claim 1, wherein the crimp sleeve is adapted to be crimped to grip the strain-relief strands between the crimp sleeve and the intermediate sleeve.

3. The connector of claim 1, wherein the ferrule back section is threaded, wherein the intermediate sleeve is threaded, and wherein the intermediate sleeve is threadedly engaged onto the ferrule back section.

4. The connector of claim 1, wherein the intermediate sleeve comprises aluminum and the crimp sleeve comprises copper.

5. The connector of claim 1, wherein the ferrule holder back section is adapted to hold a buffered layer defining a 900 µm diameter.

* * * * *